Patented July 14, 1936

2,047,258

UNITED STATES PATENT OFFICE 2,047,258

PROCESS OF DISPERSING AND STABILIZING HYDROCARBON OILS AND BITUMINOUS COMPOSITIONS

Maurice Ernotte, Brussels, Belgium

No Drawing. Application April 6, 1934, Serial No. 719,303. In Belgium April 18, 1933

4 Claims. (Cl. 134—1)

The preparation of emulsions, specially those having bitumen, tar and like oils as a base, requires the use of a dispersing and stabilizing agent, the action of which is to facilitate the mechanical division of the oil to be emulsified and to prevent subsequently the early re-union of the particles dispersed within the emulsion.

Resins and soaps and different colloidal materials have been proposed and are practically used as dispersing and stabilizing mediums. It has been stated in a general manner that the materials capable of being divided in very small particles constitute efficient stabilizers for emulsions. In this way, colloidal clays of which the particles are very fine have been used as dispersing agents in the preparation of industrial emulsions from bitumen.

According to the invention, emulsions will now be prepared by using as a stabilizing and dispersing agent the industrial by-product called "carbonating waste" and obtained by the successive reaction of lime and carbon dioxide upon certain liquids containing organic substances.

In a more particular way, the invention provides for the use as a dispersing and stabilizing medium of emulsions, the by-products from the carbonating of saccharine juices as obtained after purifying said juices; this product is ordinarily designated as carbonate waste from sugar factories.

Such by-products which are constituted with 80 to 85% of precipitated calcium carbonate and an important proportion of colloidal organic substances having a very fine texture, are generally obtained in the form of a very fine and unctuous paste. This paste made more or less fluid by the addition of water will be used, according to the invention, as a dispersing and stabilizing medium in the preparation of emulsions from bitumen and tar.

The dispersion will be made in apparatus working continuously or intermittently and the by-products will be used in their ordinary pasty condition or diluted with water and moreover, other products, such as for instance soaps or resins may be added to the said by-products for the purpose of accelerating the division of the oil to be emulsified.

The invention provides also for the preparation of emulsions containing a plurality of dispersed materials, such as for instance bitumen and tar; the preparation of such emulsions will for instance be made by dispersing primarily the oil having the highest viscosity, so as to constitute, by the division of this oil, a series of attraction centers which will facilitate the subsequent emulsifying of the more fluid oils.

Obviously, particular compositions may be obtained, according to the invention, by means of the aforesaid emulsions. Such emulsions are, for instance, useful to replace the dispersions now used for improving roads and making them waterproof, and when prepared according to the invention, such emulsions ought to contain a quantity of bitumen or tar in such a proportion that, after the emulsion has been dried, the dry residue will be in the shape of a plastic mass constituting a binder or the required waterproof coating. The proportion of bitumen and the like will be for instance such that the dry residue contains at least 30% of bitumen or the like and 70% of dry mineral substance from the by-product mentioned herebefore.

If the proportion of bitumen or the like with respect to the by-product would be less than the numerals mentioned, the mass obtained after drying would be pulverulent and not plastic, so that the resulting product would not be suitable according to the invention.

Furthermore, it has been stated that the particular nature of the material used as dispersing medium, namely the aforementioned by-products from the carbonating of saccharine juices, was such that its use presented a double advantage. Indeed, it has been observed that, after drying the emulsion, the waste constitutes a very fine mineral substance, which is intimately mixed with the bitumen or like material, so as to constitute a putty of which the new qualities may be secured precisely by the judicious calculation of the proportion of bitumen and waste.

It is indeed well known that the hydrocarbon binders, such as bitumen or tar, generally require in their applications the addition of a mineral powder or "filler", the action of which consists to afford a higher resistance to the binder and to make it less sensitive to the variations of temperature.

According to the invention, this mineral powder or filler will be formed in an ideal way by the by-product from the carbonating of saccharine juices used within the emulsion, said filler being thus formed by a chemical precipitate of calcium carbonate of excessive fineness.

Any process comprising the addition to an emulsion of bitumen or tar and carbonate waste of sugar factories would thus embody the object of the present invention, by the fact that after drying the emulsion, the waste used would instantaneously form within the dry residue a perfectly dispersed filler within the plastic mass and such filler being of an absolutely new character, owing to the fineness of its grains and its origin.

In the methods of practically working the invention, the by-products may be used mainly in their natural state, namely in the very fine pasty condition, when containing about 50% by weight of water.

By way of example, the emulsion may be prepared within a mixer provided with a heating system and in which will be introduced, in succession, the wet pasty sludge and the product to be emulsified, which will be previously heated until sufficient liquefaction.

By way of example, the preparation of the emulsion will be performed within an apparatus known as homogenizer, in which the wet scums and the substance to be emulsified will be introduced simultaneously. If the substance to be emulsified is liquid at ordinary temperature, as is the case with tars or mineral oils, the preparation may be effected in cold within an apparatus working continuously or intermittently, as mentioned herebefore.

The invention furthermore provides such steps to prevent in certain cases the setting of the emulsions within the barrels and storing containers. For this purpose, there will be added to the emulsions containing said by-products, certain materials capable of modifying the nature of the continous phase of the emulsion and to afford to said emulsion a viscosity such that no setting will be possible.

Such products will for instance be formed with organic colloidal materials or by mineral colloidal materials, capable of forming, in contact with water, more or less viscous gels for the purpose set forth.

I claim:

1. In the process of preparing emulsions from hydrocarbon oils, the step of adding to said hydrocarbon oils the by-products from the carbonating of saccharine juices as a dispersing and stabilizing medium.

2. As a composition of matter, an emulsion comprising hydrocarbon oils, water and by-products from the carbonating of saccharine juices, said by-products functioning as the emulsifying agent.

3. As a composition of matter, a bituminous emulsion comprising bitumen, water and by-products from the carbonating of saccharine juices, said by-products functioning as the emulsifying agent.

4. As a composition of matter, an emulsion comprising tar, water and by-products from the carbonating of saccharine juices, said by-products functioning as the emulsifying agent.

MAURICE ERNOTTE.